Figure 4:
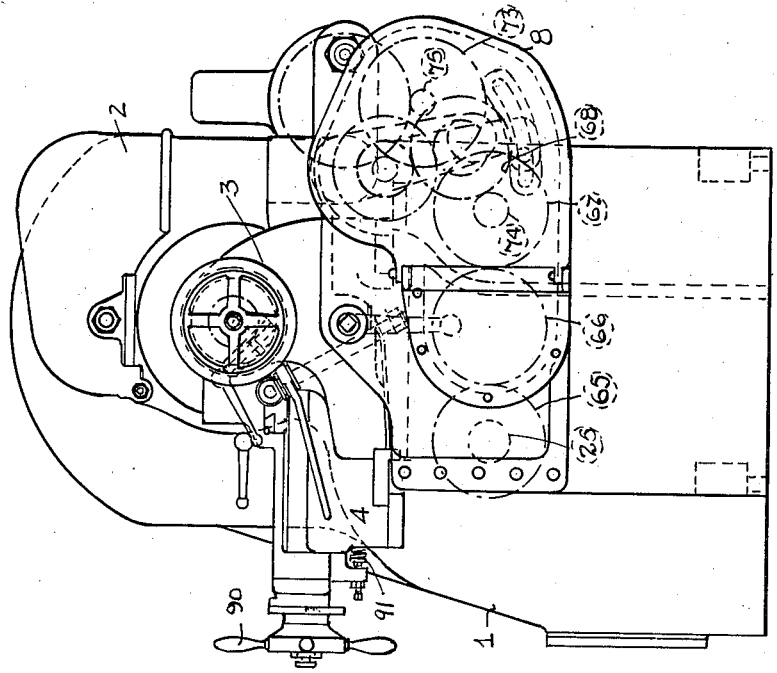

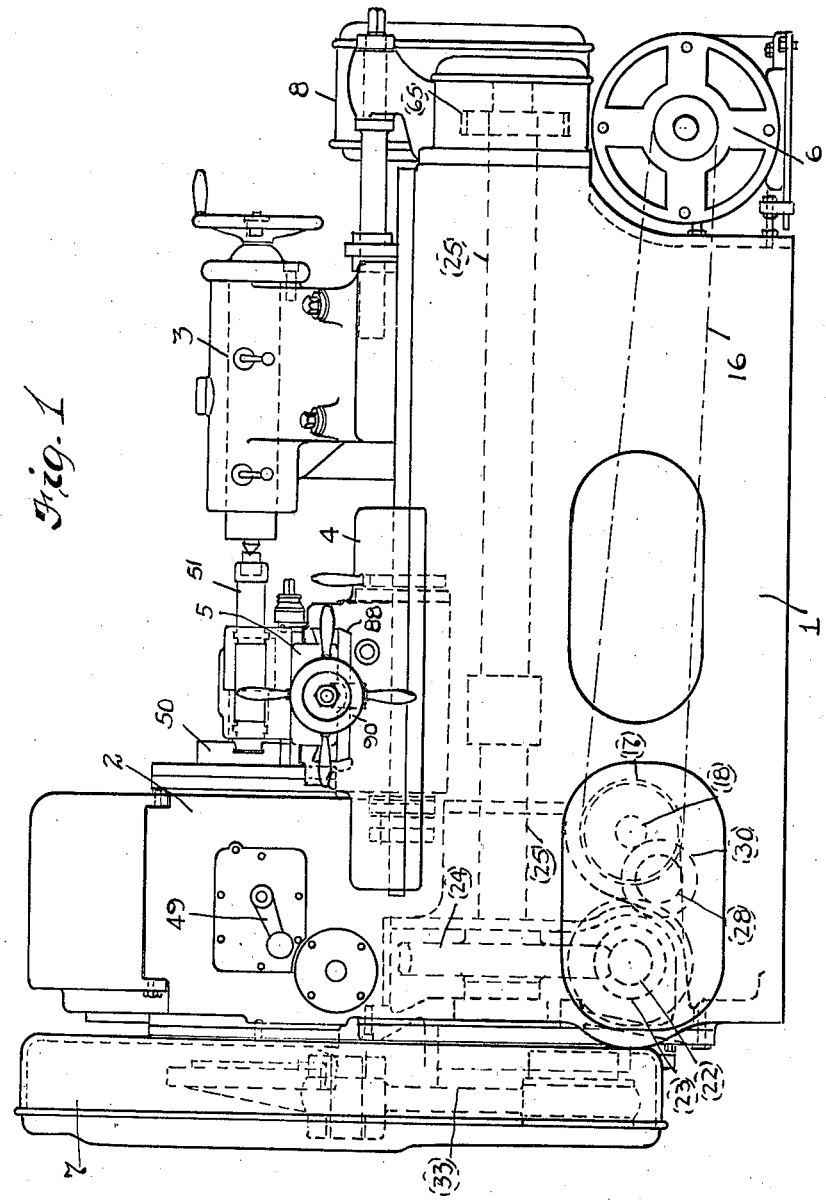

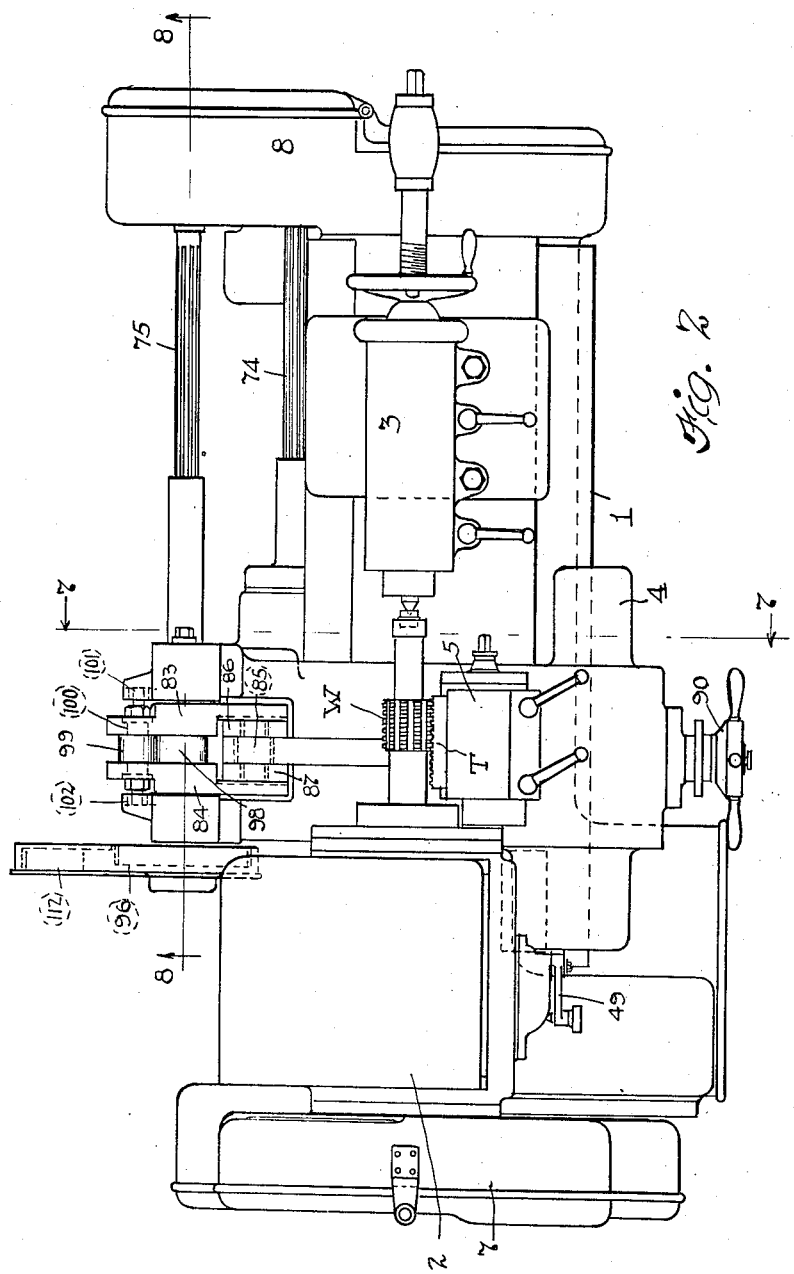

July 2, 1940.  E. J. LEES  2,206,465
HOB CUTTING MACHINE
Filed May 20, 1938  8 Sheets-Sheet 3

INVENTOR.
Ernest J. Lees, Deceased,
BY Margaret P. Lees,
Executrix
By Fay, Oberlin & Fay ATTORNEYS.

July 2, 1940.  E. J. LEES  2,206,465
HOB CUTTING MACHINE
Filed May 20, 1938  8 Sheets-Sheet 4
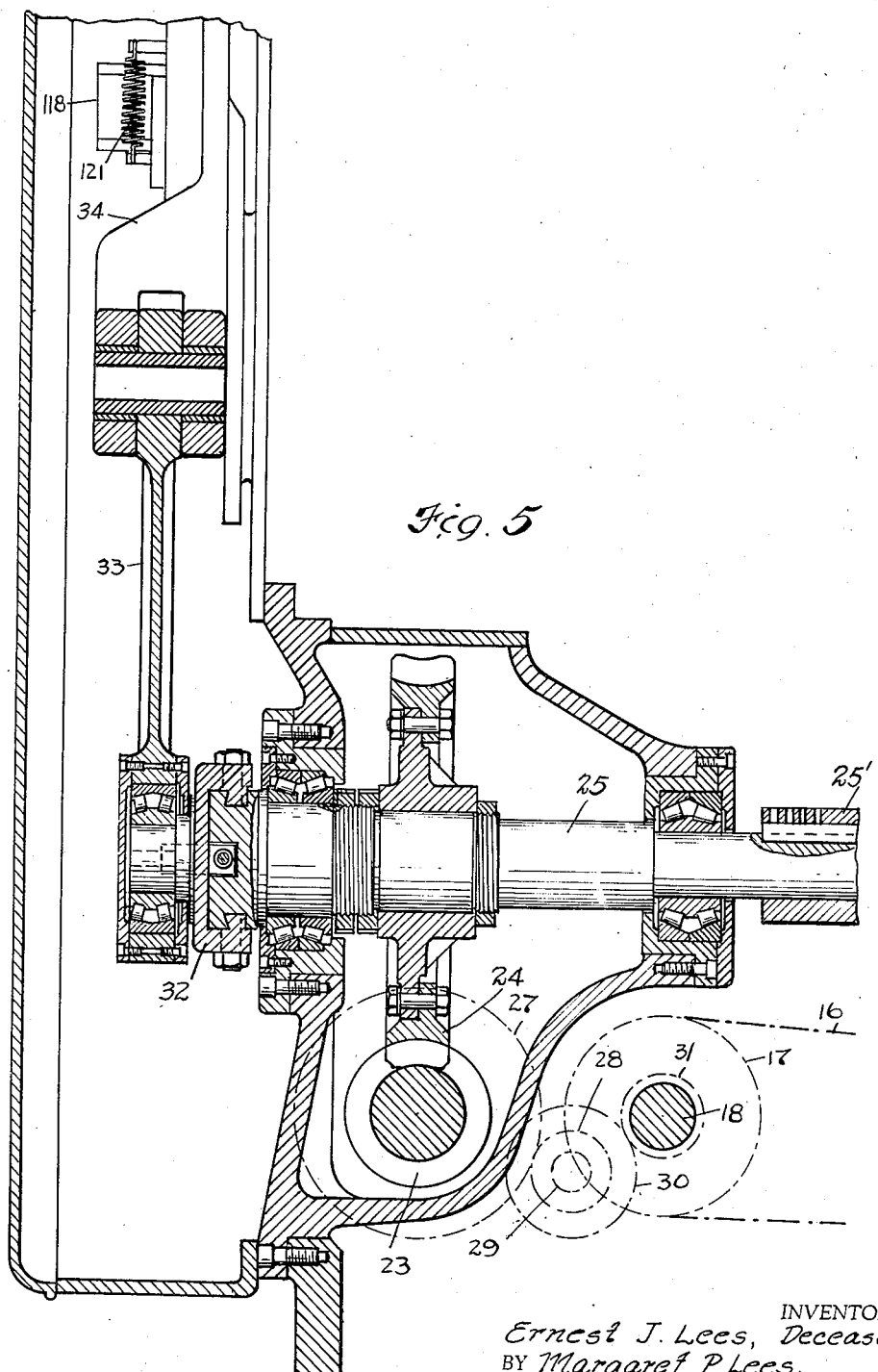
INVENTOR.
Ernest J. Lees, Deceased.
BY Margaret P. Lees,
Executrix.
By Fay, Oberlin & Fay ATTORNEYS.

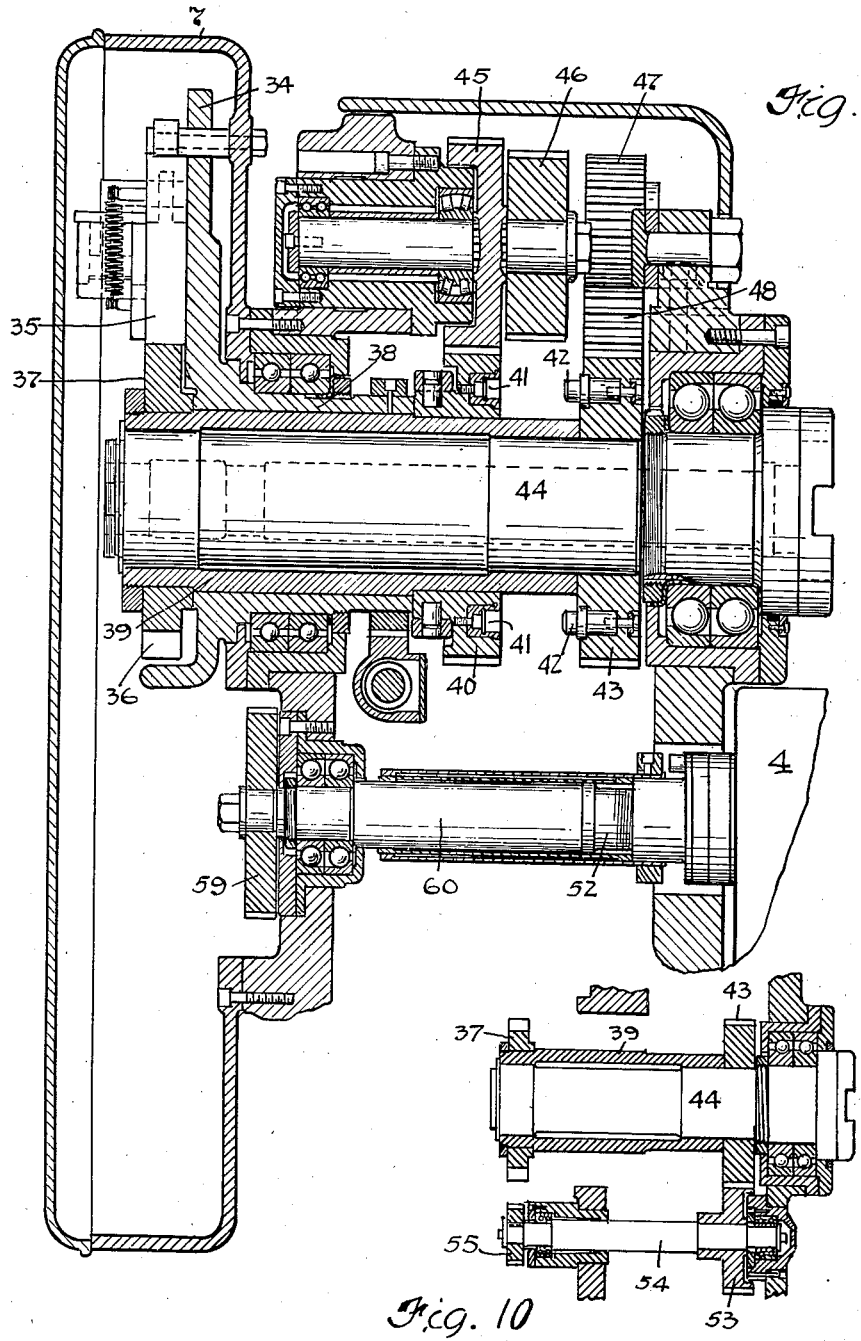

July 2, 1940.  E. J. LEES  2,206,465
HOB CUTTING MACHINE
Filed May 20, 1938  8 Sheets-Sheet 6

INVENTOR.
Ernest J. Lees, Deceased,
BY Margaret P. Lees,
Executrix.
BY Jay, Oberlin & Jay  ATTORNEYS July 2, 1940.  E. J. LEES  2,206,465
HOB CUTTING MACHINE
Filed May 20, 1938  8 Sheets-Sheet 7
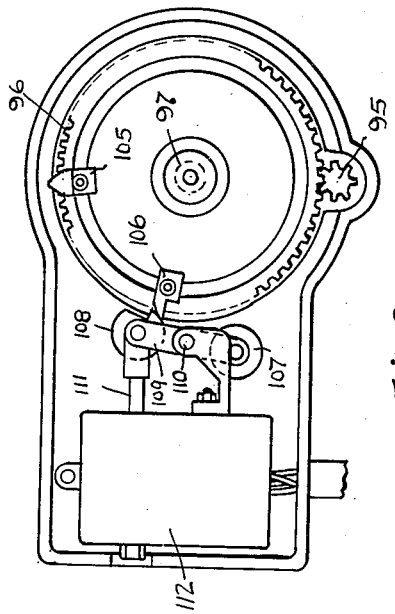
Fig. 9.
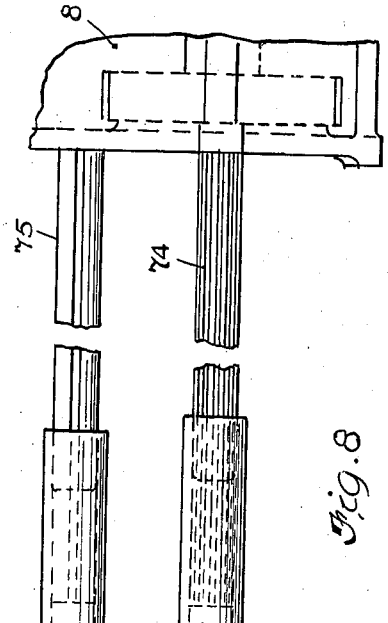
Fig. 8.
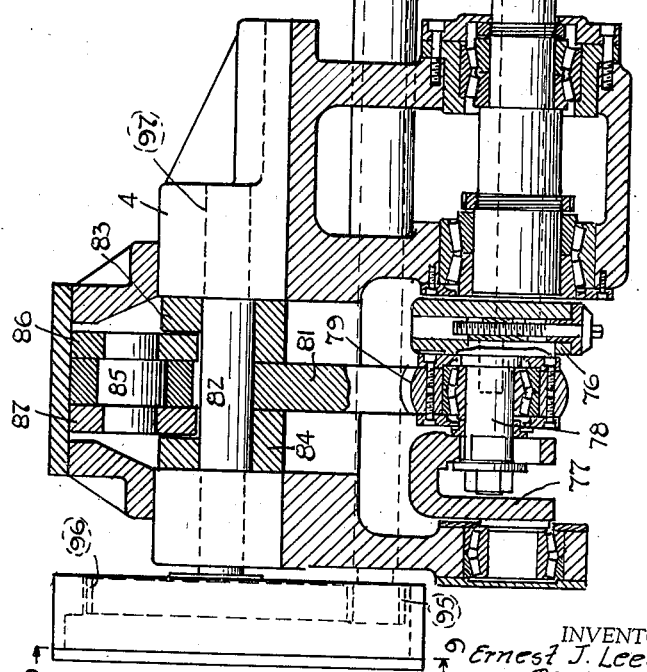
INVENTOR.
Ernest J. Lees,
Deceased,
BY Margaret P. Lees,
Executrix
BY Fay, Oberlin & Fay ATTORNEYS Patented July 2, 1940

2,206,465

UNITED STATES PATENT OFFICE 2,206,465

HOB CUTTING MACHINE

Ernest J. Lees, deceased, late of Shaker Heights, Ohio, by Margaret P. Lees, executrix, Shaker Heights, Ohio, assignor to The National Tool Company, Cleveland, Ohio, a corporation of Ohio Application May 20, 1938, Serial No. 209,050

16 Claims. (Cl. 82—19)

The present invention relates to a machine for cutting and forming hobs which are used for the manufacture of gears.

A hob is a machine tool in the general form of a worm wheel, but in order to produce a cutting and forming action upon the gear blank, the hob threads are interrupted by a series of gashes either straight or spiral, thus forming a series of cutting teeth on the hob. These teeth, in order to have an effective cutting action, must have their tops relieved in what is known in the art as a "cam drop," "relief drop," or "back off." A cutting tool for forming such teeth must, therefore, necessarily have an in and out movement with respect to the axis of the hob.

The cutting tool must also have a lateral movement parallel to the axis of the hob in order to accommodate the lead of the hob teeth. The hob or work must be oscillated or rotated back and forth with respect to the cutting tool so that a series of progressively deeper cuts can be taken by the latter. And finally, the cutting tool must be fed toward the axis of the hob, in addition to its in and out reciprocation or relieving movement, so that these last-mentioned progressively deeper cuts can be taken.

It is, therefore, the general object and nature of the invention to provide a hob cutting machine which will automatically perform all of these above outlined necessary operations, and thus result in the production of a hob with greater efficiency, substantial savings in time and with more uniformity and accuracy of result.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 3:
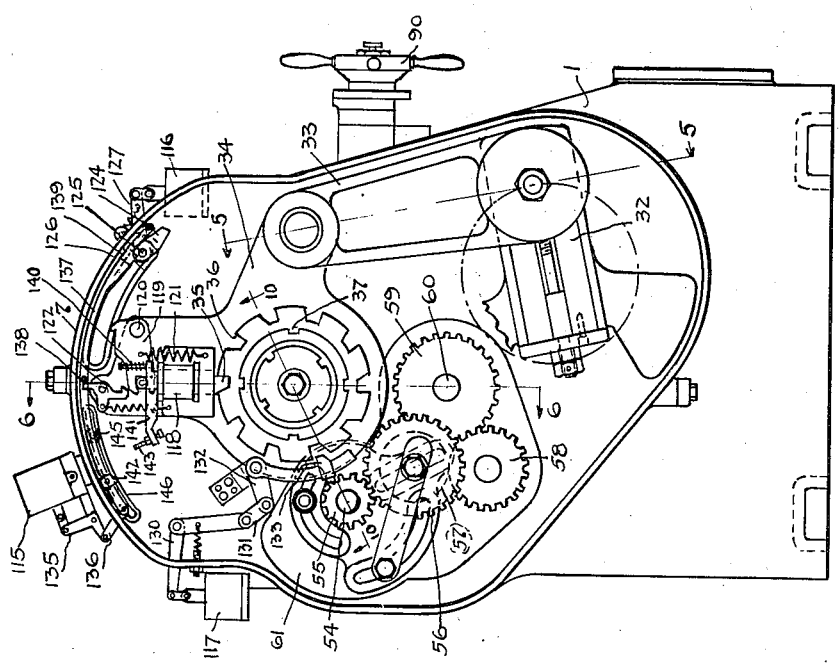
Figure 7:
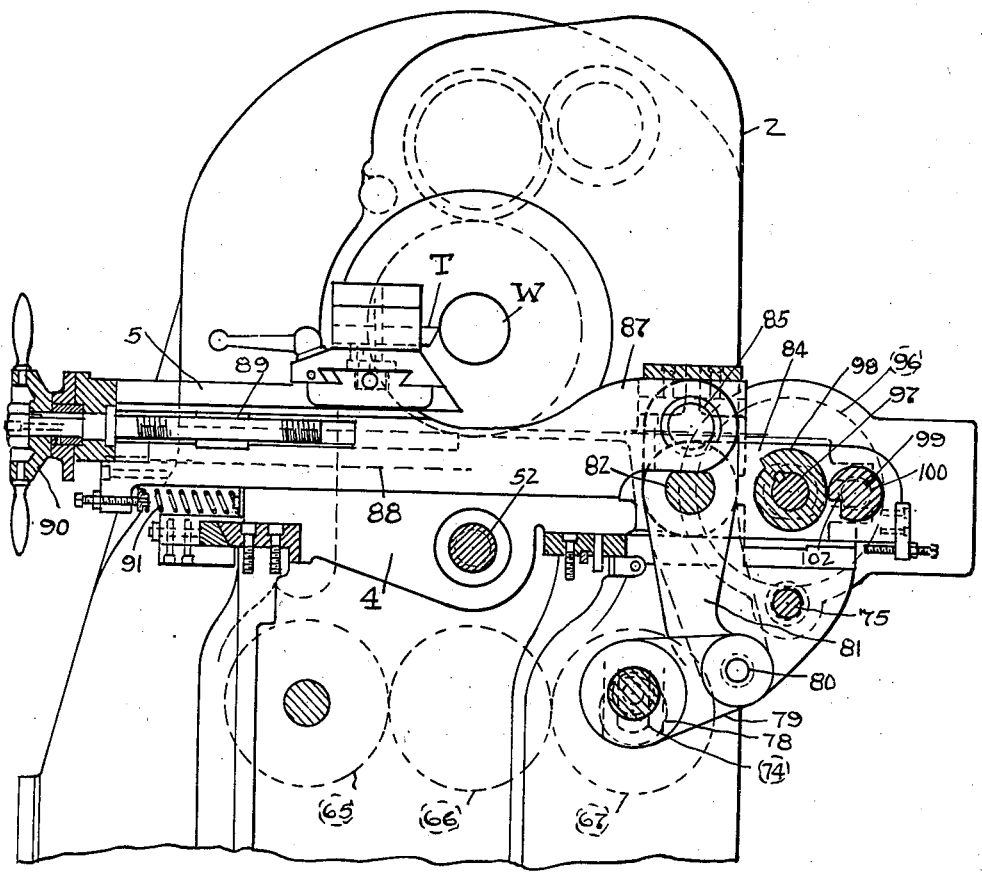
Figure 11:
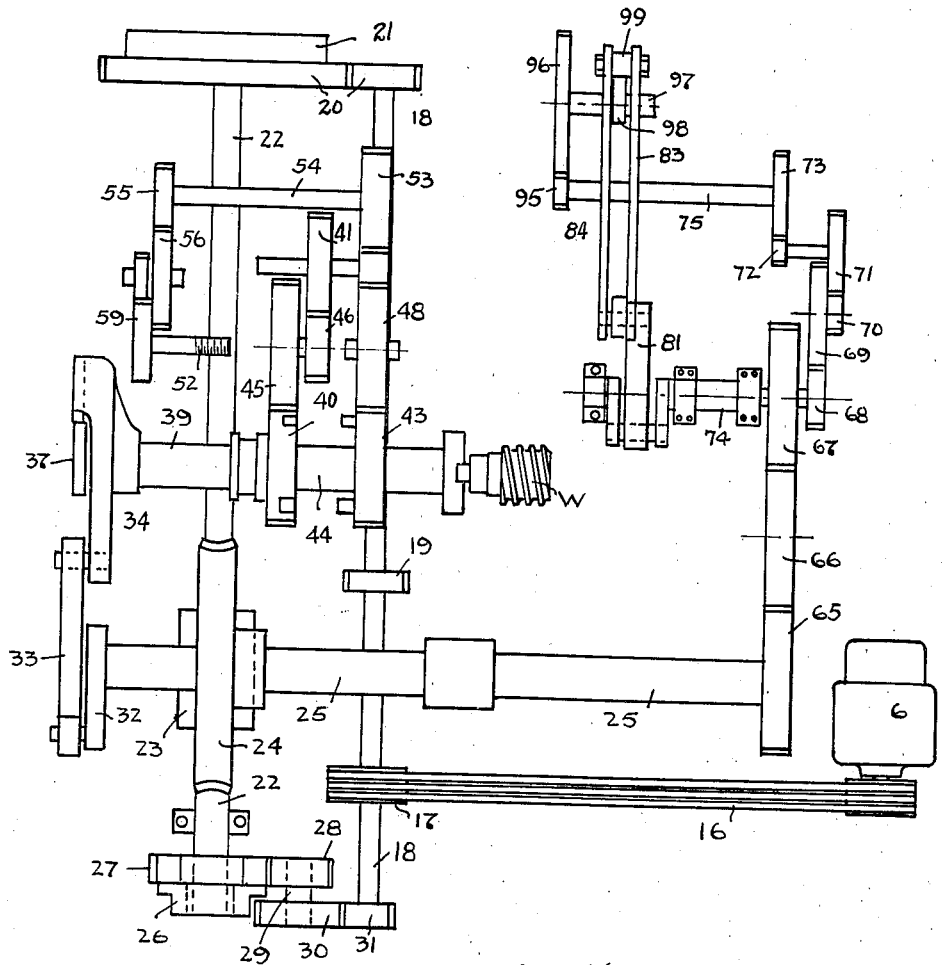

In said annexed drawings:

Fig. 1 is a front elevational view of a hob cutting machine embodying the principle of the invention; Fig. 2 is a top plan view of the same; Fig. 3 is an elevational view of the left hand end (with respect to Fig. 1) of the machine with the cover plate removed; Fig. 4 is an elevational view of the right hand end of the machine; Fig. 5 is an enlarged detail section taken through the main drive shaft and work oscillating drive connecting rod, and being taken substantially along line 5—5 of Fig. 3; Fig. 6 is an enlarged, vertical, detailed sectional view of the work spindle and tool carriage feed screw mechanism, and taken substantially along line 6—6 of Fig. 3; Fig. 7 is an enlarged, vertical sectional view taken transversely of the machine and substantially along line 7—7 of Fig. 2; Fig. 8 is a partially sectioned elevational view of the tool carriage cam drive mechanism; Fig. 9 is an enlarged, elevational detailed view of the timing gear and control switch mechanism and taken substantially along line 9—9 of Fig. 8; Fig. 10 is a reduced scale, detailed sectional view showing the connection between the work spindle and the tool carriage feed screw drive, being taken substantially along line 10—10 of Fig. 2; and Fig. 11 is a diagrammatic view illustrating the driving connections between the various parts of the machine.

For the purpose of convenience in description, the machine will now be described in detail with respect to its various component parts and features.

General assembly

Referring particularly to Figs. 1 and 2, the general assembly of the machine comprises a base 1 with a fixed housing or head-stock 2 on its left end. A tail-stock 3 is movably mounted upon the right hand end of the base 1. The work piece or hob blank W is adapted to be mounted between the head-stock 2 and the tail-stock 3. A movable tool carriage 4 carrying the laterally movable tool slide 5 is also located between the head-stock 2 and tail-stock 3. A drive motor 6 is positioned adjacent the right hand lower end of the base 1. A housing 7 on the left hand end of the machine encloses a portion of the work oscillating and tool carriage feed screw drive mechanism. A housing 8 on the right hand end of the machine encloses the tool slide reciprocating and automatic tool feed drive shaft connecting gears.

The electric control switches, wire conduits, operating solenoids and the like, which also enter into the assembly of the complete machine, have been omitted from the majority of the figures of the drawings for the purpose of convenience in illustration. These latter devices will be subsequently herein further explained in detail, and in connection with those particular parts of the machine to which they are more closely pertinent.

Main drive and work oscillating drive

Referring particularly to Figs. 1, 5 and 11, the reversible drive motor 6 is connected by the V- belt drive 16 to the pulley 17 on the shaft 18. The shaft 18 extends substantially from the front to the rear of the machine and intermediate its length there is mounted the one-way or forward drive clutch 19. Change gears 20 connect the rear end of the shaft 18 to the parallel shaft 22. A brake 21 of usual construction is connected to the shaft 22. Such brake is automatically operated by means of an electrically controlled solenoid. The latter is not shown or further described for the reason that it is already available as standard equipment upon the market, and therefore well known to those skilled in the art.

The shaft 22 carries a worm 23 which meshes with the worm wheel 24 in turn mounted upon the main drive shaft 25. On the front end of the shaft 22 there is mounted another one-way clutch 26 for reverse drive. The gear 27 is connected to the one-way clutch 26 and meshes with the gear 28 on the countershaft 29. The gears 30 and 31 connect the countershaft 29 to the shaft 18.

The foregoing elements represent the main drive mechanism of the machine. The work oscillating drive will now be described.

An adjustable length crank arm 32 is mounted on the left hand end of the drive shaft 25. The connecting rod 33 connects the crank arm 32 to the bell crank 34. As will best be seen in Figs. 3 and 6, the bell crank 34 carries a longitudinally slidable locking bar 35 which is adapted to engage between the teeth 36 of the index plate 37. The bell crank 34 has an elongated hub or sleeve 38 which rotatably fits over the hollow shaft 39 upon whose end the index plate 37 is secured.

A gear 40 is slidably carried by the hollow shaft 39 and is adapted to engage by means of the recesses 41 receiving the pins 42, with the gear 43. The gear 43 is carried by the work spindle 44. The gear 40 also meshes with a set of change gears 45, 46, 47 and 48, the latter of which in turn meshes with the gear 43. The gear 40 is shiftable along the hollow shaft 39 in the customary manner by means of a shifting lever 49 on the front of the head-stock 2.

The face plate 50 of the work spindle 44 is adapted to be connected to the work carrying arbor 51. Thus, rotation of the shaft 25 is adapted to impart oscillatory rotation to the work spindle 44 and the work W through the crank 32, connecting rod 33, bell crank 34, index plate 37, hollow shaft 39, and gears 40 and 43. Direct drive between the hollow shaft 39 and the work spindle 44 is accomplished when the gear 40 is locked to the gear 43; or, in other words, when the gears 40 and 43 are so engaged, the work W will be oscillated at the same speed as the oscillation or rocking movement of the bell crank 34. When the drive from the hollow shaft 39 to the work spindle 44 is alternatively connected to the change gears 47 and 48, the speed of reciprocal rotation or rate of oscillation of the work W can be so set and determined as to be faster or slower than the rate of oscillation of the bell crank 34. The direct drive is employed when cutting straight gash hobs. The change speed drive is employed when cutting spiral gash hobs, a faster or slower speed of oscillation with respect to that of the bell crank 34 depending on whether the hob to be formed has a right hand or a left hand helix of its gashes.

Tool carriage feed drive

Since the movement of the tool carriage 4 in a direction parallel to the axis of the hob or work W must be synchronized with the oscillation of the work about its own axis, the drive for the tool carriage feed screw 52 is derived from the work spindle 44. Directing attention to Figs. 3, 6, 10 and 11, the gear 43 meshes with the gear 53 on the shaft 54. (These gears are not shown in mesh in Fig. 11 for the obvious reason that in order to facilitate the diagrammatic illustration, the shafts and gears in such figure have necessarily had to be transmuted into substantially a single plane.) The left hand end of the shaft 54 extends into the housing 7 and carries a gear 55, which through the change gears 56, 57 and 58 is connected to the gear 59 on the left hand end of the feed screw shaft 60. The latter in turn carries the feed screw 52 which engages with the tool carriage 4 in customary manner.

As will be seen in Fig. 3, a shiftable quadrant mounts the change gears 56 and 57 and is for the purpose of accommodating different sizes and changes of gears in the gear train leading from the shaft 54 to the feed screw shaft 60.

In this manner it will be seen that the tool carriage 4 is moved in a back and forth direction parallel to the axis of the work W and in synchronization with the rotary oscillation of the latter. The amount of travel back and forth of the tool carriage 4 with respect to the amount of oscillation of the work W is variably regulated by the change gears 56, 57 and 58, the amount of travel required being dependent upon the lead or pitch of the hob teeth.

Tool slide reciprocating mechanism

The drive shaft 25 extends to the right hand end of the machine, as will be seen in Fig. 1. For the purpose of convenience in manufacture and assembly, the shaft 25 is made in two pieces joined together by a sleeve coupling 25'.

A gear 65 is mounted on the right hand end of the shaft 25, meshes with the idler gear 66 which in turn meshes with a train of change gears 67 to 73 inclusive (see Figs. 4 and 11). The gear 67 is mounted on the end of the crankshaft 74 and the gear 73 is mounted on the end of the cam drive shaft 75. The last named gears are of course enclosed in the housing 8.

Both of the shafts 74 are longitudinally extensible by means of the splines and spline fittings as will be seen in Figs. 2 and 8. The shaft 74 has an adjustable throw, double arm crank consisting of the crank arms 76 and 77 carrying the connecting rod bearing 78 to which the one end of the connecting rod 79 is journalled. The other end of the connecting rod 79 is pivotally connected at the bearing 80 to the rock lever arm 81 (Figs. 7 and 8). The rock lever arm 81 is connected intermediate its ends, and by means of the pin 82 to the cam follower arms 83 and 84. The upper end of the rock lever arm 81 is connected by means of the collared cross-pin 85 to the bifurcated arms 86 and 87 extending from the rear end of the tool slide 5. The tool slide 5 is of course mounted in the dove tail slideways 88 on the top portion of the tool carriage 4 and is manually adjustable thereon by means of the customary hand operated feed screw 89 having the hand wheel 90. A compression spring 91 (Fig. 7) is mounted between the tool slide 5 and the tool carriage 4 and tends to urge the former in a direction toward the front of the machine, or in a left hand direction with respect to Fig. 7.

It will thus be seen that rotation of the crank shaft 74 will cause an oscillation of the lever arm 81 about the pin 82, resulting in a reciprocation of the tool slide in a direction normal to the axis of the hob or work piece W.

The last described mechanism accomplishes the necessary relieving or backing off movement of the tool T with respect to the work W. As previously indicated, the invention provides additional means for imparting an automatic feed movement of the tool T towards the axis of the work W, which movement is cumulative to the relieving or backing off movement. The mechanism for accomplishing such automatic feed will now be described.

The shaft 75 extends through the tool carriage 4 and has a pinion gear 95 on its outermost end. The gear 95 meshes with a larger or timing gear 96 mounted upon the end of the cam shaft 97. A cam 98 is carried by the cam shaft 97 and is adapted to bear against the cam follower 99 held between the two previously mentioned cam follower arms 83 and 84. As will be seen from Fig. 2, the pin 100 which mounts the cam follower 99 in the arms 83 and 84 has projecting ends 101 and 102 which are received in horizontal slots in the tool carriage 4, thus providing a horizontal guide preventing vertical displacement of the cam follower 99.

It will thus be seen that rotation of the cam 98 (in a clockwise direction with respect to Fig. 7) will operate to move the pin 82 in a right hand direction, thus progressively drawing the tool slide 5 and tool T in toward the axis of the work W during reciprocation.

Control mechanism

The mechanism by which the operation of the above described various component parts of the machine is controlled can best be explained by particular reference to Figs. 3 and 9. The timing gear 96 on the end of the cam shaft 97 has a pair of adjustable trip lugs 105 and 106 which are adapted to contact the rollers or followers 107 and 108 on each end of the rock bar 109 which is pivoted at 110. The upper end of the rock bar 109 is connected by means of the rod 111 to the electric control switch 112.

The switch 112 is in turn electrically connected to the main power switch (not shown) of the drive motor 6, the secondary control switch 115 located on the top of the housing 7, the solenoid (not shown) actuating the brake 21, and the indexing control mechanism solenoids 116 and 117.

The locking bar 35 on the bell crank 34 is connected to a dash pot 118. A latch lever 119 is pivotally mounted upon the bell crank 34 at the point 120. A tension spring 121 connected to the latch lever 119 tends to draw the latter in a downward direction. A trip lever 122 is pivotally mounted above the latch lever 119 and has a lower hooked end which is adapted to engage with the end of the latter. A latch setting trip lug 124 is mounted on the end of a rock shaft 125 which extends through the arcuate slot 126. A connecting arm 127 connects the rock shaft 125 to the electric solenoid 116. The electric solenoid 116, trip lug 124, rock shaft 125, and connecting arm 127 are mounted upon a common supporting bracket (not shown) which is adjustable as to position in the arcuate slot 126.

The electric solenoid 117 is connected through the bell crank lever 130, connecting link 131, second bell crank lever 132 to the index plate locking lug 133.

The electric switch 115 is connected by means of the bell crank 135 and link 136 to one end of the arcuate bar 137 which is centrally pivoted to the housing 7 at 138. The arcuate bar 137 carries a contact lug 139 which is adapted to engage with the threadably adjustable pin 140 on the right hand end (with respect to Fig. 2) of the cross bar 141 mounted upon the locking bar 135. A second contact lug 142 is also carried by the arcuate bar 137 and is adapted to be engaged by the threaded, adjustable contact pin 143 on the left hand end of the cross bar 141.

A trip pin 145 adjustably mounted in the arcuate slot 146 in the side of the housing 7 is adapted to engage with the upper end of the latch trip lever 122.

Operation

With the gashed hob blank W mounted in the machine, the cutting tool T is initially set at such a position as to begin its cut upon the first series of hob teeth. If a straight gash hob is to be cut, a multiple tooth cutting tool T as shown in Fig. 2 may be used. On the other hand, if a spiral gash hob is to be cut, a single tooth type of formed tooth tool cutter is required. The throw of the adjustable crank arm 32 is then set so that the amount of oscillation or angular travel of the work spindle 44 will correspond to the circumferential distance between the hob gashes. Change gears 56 and 57 are placed in the machine which will correspond to the lead or pitch of the hob teeth. Likewise, change gears are placed in the gear train 67 to 71 which will correspond to the desired speed of cutting.

The drive motor 6 is then started in a forward direction whereupon power is transmitted through the shaft 18, forward one way clutch 19, gear 20, shaft 22, worm 23, worm gear 24, shaft 25, crank arm 32, connecting rod 33, bell crank arm 34, work spindle 44, to oscillate the work W. Simultaneously, the tool carriage 4 and tool T are moved in a direction back and forth parallel to the axis of the work W and through the drive connections leading from the gear 43 to the feed screw 52. A backing off or relieving motion, viz., an in and out reciprocation normal to the axis of the work W, of the tool slide 5 is accomplished by the drive connection from the shaft 25 through the gears 65, 66, 67, to the shaft 74, to the rock lever 81. The automatic feed of the tool T toward the axis of the work W is also simultaneously accomplished by the drive through the gears 68 to 73, to the shaft 75, gears 95 and 96, cam 98, cam follower 99 and cam follower connecting arms 83 and 84.

As soon as the trip lug 105 on the timing gear 96 engages with the roller 107, the electric switch 112 is so operated as to apply the brake 21 and throw the drive motor 6 into reverse. The trip lug 105 is so set upon the timing gear 96 as to be slightly in advance of the brake or drop in the cam 98, viz., just before the reaching of the inner limit of the automatic feed of the cutting tool T. When the brake 21 is applied, the drive shaft 22 and its connected parts immediately begin to slow down with the result that a slower rate of oscillation of the work W results. When the drive motor 6 is then thrown into reverse, the drive will be through the gears 30 and 31, countershaft 29, gear 28, gear 27 to the one-way reverse clutch 26. But due to the interposition of the countershaft 29, the direction of drive, upon reversing of the motor will still be the same as it is applied to the shaft 22, but at a slower rate of speed. The one-way clutches 19 and 26, therefore, operate as an automatic transmission for changing the gear ratio of the drive imparted from the drive motor to the main shaft 25 upon reversal of the former.

At this point in the operation, the machine has been slowed down and the cutting tool is approaching the end of its cutting stroke on one series of teeth. When the cam 98 reaches its brake or drop off, the second trip lug 106 on the timing gear 96 then actuates the electric switch 112 through contact with the roller 107, whereupon the switch 112 actuates the solenoid 116 so that the latch setting lug 124 drops down to engage the latch lever 119. Upon such engagement, the tendency of the bell crank 34 to move in a left hand direction (with respect to Fig. 3) operates to draw the latch lever 119 and the locking bar 35 in an upward direction where they are held by engagement with the latch tripping lever 122. Simultaneously, the pin 140 contacts with the lug 139 to trip the arcuate bar 137 and thereby throw the switch 115. The switch 115 in turn actuates the solenoid 117 to move the index plate locking lug in between the teeth 36 of the index plate 37 and thus hold the latter in a stationary position. As the bell crank 34 then moves in a left hand direction, the contact pin 143 engages with the lug 142 to again actuate the electric switch 115 which in turn operates the solenoid 117 to release the locking lug 133, and the electric switch 115 also operates the solenoid 116 to raise the trip lug 124 out of engaging position. Simultaneously with this last described operation, the arm 138 on the trip latch lever 122 engages with the pin 145, releasing the latch mechanism and allowing the locking bar 35 to engage with the next adjacent space (in a counterclockwise direction) between the teeth 36 of the index plate 37.

The work W is thereby indexed or advanced to the next series of teeth, and the cycle of operations are repeated until the teeth have been completely cut around the periphery of the hob. Where a multiple tooth cutting tool T is employed, as on a straight gash hob, the length of the tool being greater than the length of the hob, one circumferential cycle of the tool with respect to the hob will be sufficient to complete the cutting of the latter. However, where a single formed tooth tool is used, as in the cutting of a spiral gash hob, it is necessary to have the tool make one or more circumferential cycles with respect to the hob depending upon the pitch of the teeth and length of the latter, as will readily be understood by those skilled in the art.

Other modes of applying the principle of the invention may be employed instead of the one explained, change being made as regards the mechanism herein disclosed, provided the means stated by any of the following claims or the equivalent of such stated means be employed.

It is therefore pointed out and distinctly claimed as the invention:

1. In a hob cutting machine, the combination of a hob supporting spindle, means for oscillating said spindle about its axis, indexing means for rotating said spindle with respect to said oscillating means, a cutting tool, means for reciprocating said tool in a direction perpendicular to the axis of said hob, means for traversing said tool in a direction parallel to the axis of said hob, and means for gradually increasing the extent of such reciprocating movement of said tool towards said hob.

2. In a hob cutting machine, the combination of a hob supporting spindle, means for oscillating said spindle about its axis, indexing means for rotating said spindle with respect to said oscillating means, a cutting tool, means for reciprocating said tool in a direction perpendicular to the axis of said hob, means for gradually increasing the extent of such reciprocating movement of said tool towards said hob, and means for varying the speed of oscillation of said spindle.

3. In a hob cutting machine, the combination of a hob supporting spindle, means for oscillating said spindle about its axis, indexing means for rotating said spindle with respect to said oscillating means, a cutting tool, means for reciprocating said tool in a direction perpendicular to the axis of said hob, means for gradually increasing the extent of such reciprocating movement of said tool towards said hob, and means for varying the amount of oscillation of said spindle.

4. In a hob cutting machine, the combination of a hob supporting spindle, means for oscillating said spindle about its axis, indexing means for rotating said spindle with respect to said oscillating means, a cutting tool, means for reciprocating said tool in a direction perpendicular to the axis of said hob, means for gradually increasing the extent of such reciprocating movement of said tool towards said hob, means for varying the speed of oscillation of said spindle, and means for varying the amount of oscillation of said spindle.

5. In a hob cutting machine, the combination of a hob supporting spindle, means for oscillating said spindle about its axis, indexing means for rotating said spindle with respect to said oscillating means, a cutting tool, means for reciprocating said tool in a direction perpendicular to the axis of said hob, means for gradually increasing the extent of such reciprocating movement of said tool towards said hob, and means for varying the amount of reciprocation of said tool.

6. In a hob cutting machine, the combination of a hob supporting spindle, means for oscillating said spindle about its axis, indexing means for rotating said spindle with respect to said oscilating means, a cutting tool, means for reciprocating said tool in a direction perpendicular to the axis of said hob, means for gradually increasing the extent of such reciprocating movement of said tool towards said hob, means for varying the speed of oscillation of said spindle, and means for varying the amount of reciprocation of said tool.

7. In a hob cutting machine, the combination of a hob supporting spindle, means for oscillating said spindle about its axis, indexing means for rotating said spindle with respect to said oscillating means, a cutting tool, means for reciprocating said tool in a direction perpendicular to the axis of said hob, means for gradually increasing the extent of such reciprocating movement of said tool towards said hob, means for varying the amount of oscillation of said spindle, and means for varying the amount of reciprocation of said tool.

8. In a hob cutting machine, the combination of a hob supporting spindle, means for oscillating said spindle about its axis, indexing means for rotating said spindle with respect to said oscillating means, a cutting tool, means for reciprocating said tool in a direction perpendicular to the axis of said hob, means for gradually increasing the extent of such reciprocating movement of said tool towards said hob, means for varying the speed of oscillation of said spindle, means for varying the amount of oscillation of said spindle, and means for varying the amount of reciprocation of said tool.

9. In a hob cutting machine, the combination of a hob supporting spindle, a carriage movable parallel to the axis of said hob, a slide adapted to carry a cutting tool and slidably mounted on said carriage in a direction perpendicular to the axis of said hob, reciprocating means connected to said slide, and feeding means connected to said reciprocation means for moving said slide towards said hob during reciprocation of the former.

10. In a hob cutting machine, the combination of a hob supporting spindle, a carriage movable parallel to the axis of said hob, a slide adapted to carry a cutting tool and slidably mounted on said carriage in a direction perpendicular to the axis of said hob, reciprocating means connected to said slide, feeding means connected to said reciprocating means for moving said slide towards said hob during reciprocation of the former, and spring means for returning said slide to starting position after operation of said feeding means.

11. In a hob cutting machine, the combination of a hob supporting spindle, a carriage movable parallel to the axis of said hob, a slide adapted to carry a cutting tool and slidably mounted on said carriage in a direction perpendicular to the axis of said hob, reciprocating means connected to said slide, and cam means connected between said reciprocating means and said carriage for feeding said slide towards said hob during reciprocation of the former.

12. In a hob cutting machine, the combination of a hob supporting spindle, a carriage movable parallel to the axis of said hob, a slide adapted to carry a cutting tool and slidably mounted on said carriage in a direction perpendicular to the axis of said hob, a rock lever having one end connected to said slide, means for reciprocating the other end of said lever, and cam means connecting the intermediate portion of said lever to said carriage.

13. In a hob cutting machine, the combination of a hob supporting spindle, a carriage movable parallel to the axis of said hob, a slide adapted to carry a cutting tool and slidably mounted on said carriage in a direction perpendicular to the axis of said hob, a main drive shaft, a power driving means connected to said shaft, a crank arm and connecting rod connecting said shaft to said spindle for oscillating the latter, a rock lever having one end connected to said slide, means for reciprocating the other end of said lever, cam means connecting the intermediate portion of said lever to said carriage, and means connecting said main drive shaft to said reciprocating means and to said cam means.

14. In a hob cutting machine, the combination of a hob supporting spindle, a carriage movable parallel to the axis of said hob, a slide adapted to carry a cutting tool and slidably mounted on said carriage in a direction perpendicular to the axis of said hob, a main drive shaft, a power driving means connected to said shaft, a crank arm and connecting rod connecting said shaft to said spindle for oscillating the latter, a feed screw connected to said carriage for moving the latter, means for connecting said feed screw to said main drive shaft, a rock lever having one end connected to said slide, means for reciprocating the other end of said lever, cam means connecting the intermediate portion of said lever to said carriage, and means connecting said main drive shaft to said reciprocating means and to said cam means.

15. In a hob cutting machine, the combination of a hob supporting spindle, a carriage movable parallel to the axis of said hob, a slide adapted to carry a cutting tool and slidably mounted on said carriage in a direction perpendicular to the axis of said hob, a main drive shaft, a power driving means connected to said shaft, a crank arm and connecting rod connecting said shaft to said spindle for oscillating the latter, indexing means for changing the point of connection of said connecting rod to said spindle, a rock lever having one end connected to said slide, means for reciprocating the other end of said lever, cam means connecting the intermediate portion of said lever to said carriage, means connecting said main drive shaft to said reciprocating means and to said cam means, and control means actuated by said cam means for operating said indexing means.

16. In a hob cutting machine, the combination of a hob supporting spindle, a carriage movable parallel to the axis of said hob, a slide adapted to carry a cutting tool and slidably mounted on said carriage in a direction perpendicular to the axis of said hob, a main drive shaft, a power driving means connected to said shaft, a crank arm and connecting rod connecting said shaft to said spindle for oscillating the latter, a feed screw connected to said carriage for moving the latter, means for connecting said feed screw to said main drive shaft, indexing means for changing the point of connection of said connecting rod to said spindle, a rock lever having one end connected to said slide, means for reciprocating the other end of said lever, cam means connecting the intermediate portion of said lever to said carriage, means connecting said main drive shaft to said reciprocating means and to said cam means, and control means actuated by said cam means for operating said indexing means.

MARGARET P. LEES,
*Executrix of the Estate of Ernest J. Lees, Deceased.*